United States Patent
Andres et al.

(10) Patent No.: US 7,922,593 B2
(45) Date of Patent: Apr. 12, 2011

(54) DRIVESHAFT ASSEMBLY

(75) Inventors: Gregory R. Andres, Three Rivers, MI (US); Matthew T. Kahler, Berkley, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 273 days.

(21) Appl. No.: 12/256,889

(22) Filed: Oct. 23, 2008

(65) Prior Publication Data
US 2010/0105489 A1 Apr. 29, 2010

(51) Int. Cl.
*F16C 3/00* (2006.01)

(52) U.S. Cl. .................... 464/183; 464/180

(58) Field of Classification Search .......... 464/180, 464/182, 183; 403/359.1–359.6
See application file for complete search history.

(56) References Cited

U.S. PATENT DOCUMENTS

| | | | |
|---|---|---|---|
| 3,367,142 A * | 2/1968 | Groves et al. | 464/162 |
| 3,395,552 A * | 8/1968 | Hauser, Jr. | 464/88 |
| 3,638,455 A | 2/1972 | Francois | |
| 4,014,184 A * | 3/1977 | Stark | 464/180 |
| 4,406,641 A * | 9/1983 | Mallet | 464/162 |
| 4,527,978 A | 7/1985 | Zackrisson | |
| 5,851,152 A | 12/1998 | Ilzhofer et al. | |
| 6,193,612 B1 | 2/2001 | Craig et al. | |
| 6,279,221 B1 | 8/2001 | Glowacki et al. | |
| 6,557,433 B1 * | 5/2003 | Castellon | 74/492 |
| 6,754,943 B1 | 6/2004 | Perry et al. | |
| 6,761,503 B2 * | 7/2004 | Breese | 403/359.5 |
| 7,160,195 B2 | 1/2007 | Lyon et al. | |
| 7,288,029 B1 * | 10/2007 | Lyon et al. | 464/162 |
| 2002/0160844 A1 | 10/2002 | Ginsberg et al. | |
| 2007/0178975 A1 | 8/2007 | Neugebauer et al. | |

* cited by examiner

*Primary Examiner* — Aaron Dunwoody
(74) *Attorney, Agent, or Firm* — Harness, Dickey & Pierce, P.L.C.

(57) ABSTRACT

A driveshaft with a hollow shaft, a pair of caps and a universal joint. The hollow shaft is rotatable about an axis and has an annular wall member that defines an outer surface, an inner surface and a pair of opposite ends. At least one of the outer surface and the inner surface includes a plurality of longitudinally extending splines. The caps are fixedly coupled to the opposite ends of the hollow shaft to at least substantially close the opposite ends of the hollow shaft. The universal joint is coupled to one of the caps. The splines extend the length of the hollow shaft.

18 Claims, 3 Drawing Sheets

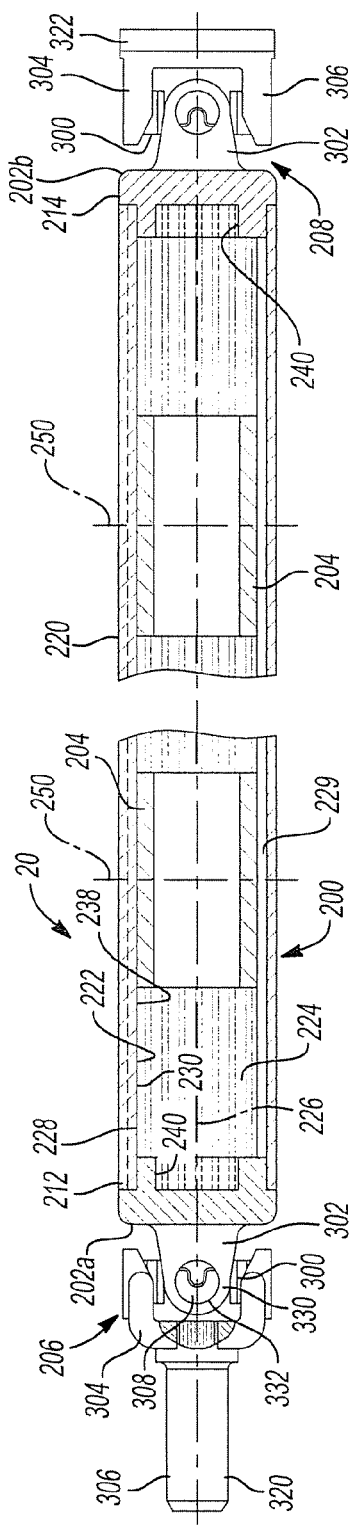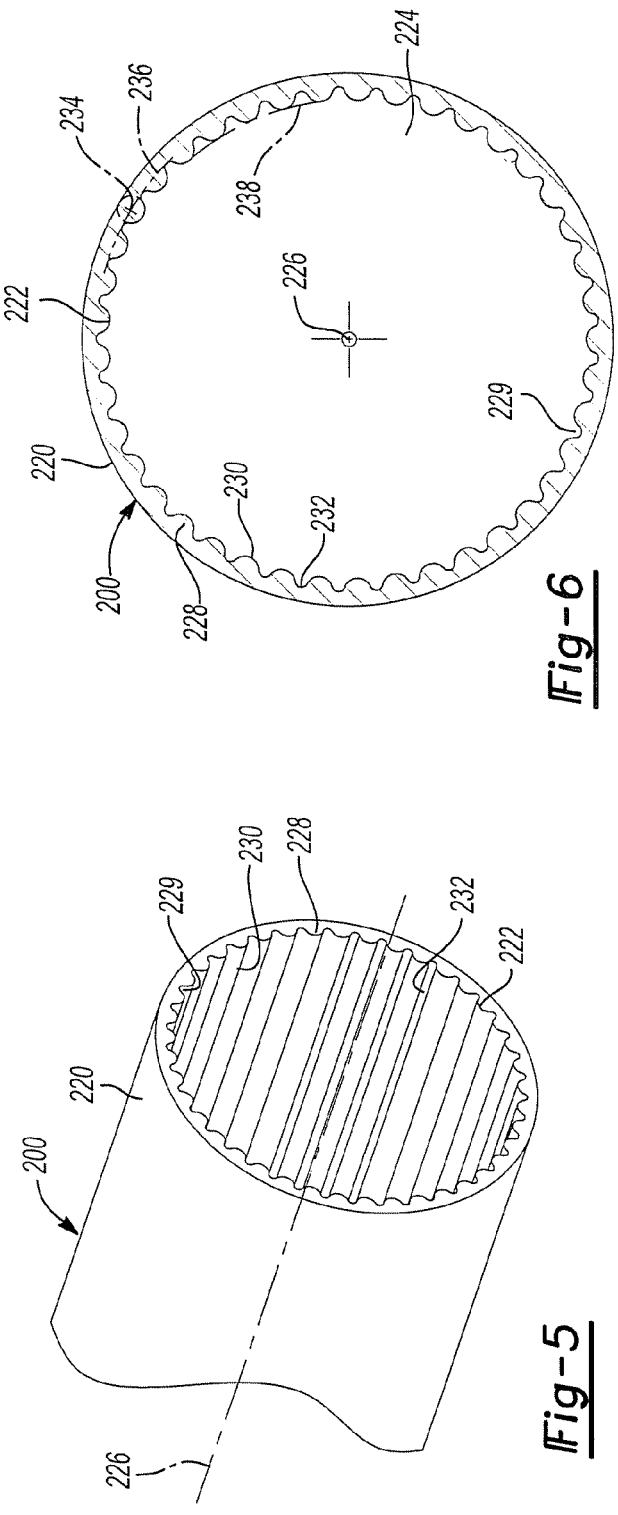

DRIVESHAFT ASSEMBLY

FIELD

The present disclosure relates to a driveshaft assembly and more particularly to a driveshaft having a splined inner surface.

BACKGROUND

The statements in this section merely provide background information related to the present disclosure and may not constitute prior art.

Driveshafts (or propshafts) are typically employed to transmit rotary power in a drive line, such as, for example, between a transmission or transfer case and a front or rear axle. Modern automotive driveshafts are commonly formed from steel or aluminum tubing. A traditional driveshaft tube may have three primary dimensions including length, outer diameter, and wall thickness. The length of the tube is typically determined by the distance between a transmission output shaft and an axle input shaft. The outer diameter and wall thickness of the driveshaft tube typically depend on the critical speed and torsional strength requirements. Conventional driveshaft tubes have a constant wall thickness.

Maintaining a desired critical speed and torsional strength is typically achieved at the expense of vehicle packaging. Decreasing the outer diameter and/or wall thickness of a conventionally designed driveshaft decreases the area moment of inertia (critical speed is proportional to the square root of area moment of inertia) and torsional strength, and thereby adversely affects the critical speed and vibration attenuation properties. Accordingly, the conventional driveshaft often requires a relatively large outer diameter and wall thickness to achieve the desired critical speed.

In light of the foregoing, there remains a need in the art for a driveshaft that provides for improved vehicle packaging, while maintaining or improving the critical speed, stiffness, and vibration attenuation properties of the driveshaft. The teachings of the present disclosure allow a driveshaft having a reduced outer diameter to improve vehicle packaging without adversely affecting critical speed, torsional yield strength, or vibration damping properties.

SUMMARY

In one form, the present teachings provide a driveshaft with a hollow shaft, a pair of caps and a universal joint. The hollow shaft is rotatable about an axis and has an annular wall member that defines a cylindrical outer surface, an inner surface and a pair of opposite ends. The inner surface includes a plurality of longitudinally extending splines. The caps are fixedly coupled to the opposite ends of the hollow shaft to at least substantially close the opposite ends of the hollow shaft. The universal joint is coupled to one of the caps. The splines extend the length of the hollow shaft.

In another form, the present teachings provide a vehicle driveline that includes a first driveline component, a second driveline component and a driveshaft coupling the first driveline component to the second driveline component to transmit drive torque therebetween. The driveshaft has a hollow shaft, a pair of caps, and a pair of universal joints. The hollow shaft has an annular wall member that defines a cylindrical outer surface, an inner surface and a pair of opposite axial ends. The inner surface has a plurality of longitudinally extending splines and a plurality of longitudinally extending grooves that are disposed between the plurality of longitudinally extending splines. The pair of caps are fixedly coupled to the hollow shaft to at least substantially close the opposite axial ends. Each of the universal joints is coupled to an associated one of the caps. The longitudinally extending splines extend along the hollow shaft between the caps.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 4 is a partial longitudinal cross-sectional view of the driveshaft assembly;

FIG. 5 is a partial perspective view of the driveshaft assembly; and

FIG. 6 is a lateral cross-sectional view of a portion of the driveshaft taken along the line 6-6 of FIG. 4.

DETAILED DESCRIPTION

Figure 1:
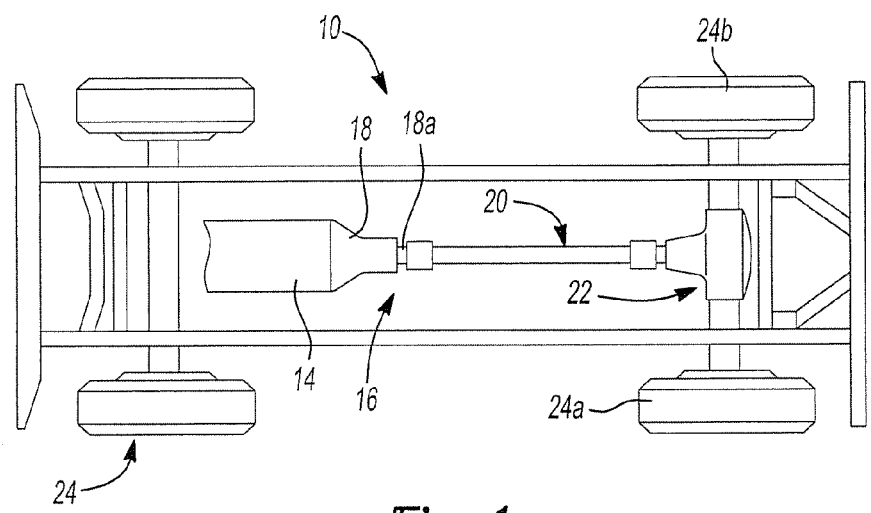
FIG. 1 is a schematic illustration of an exemplary vehicle constructed in accordance with the teachings of the present disclosure.

The following description is merely exemplary in nature and is not intended to limit the present disclosure, application, or uses. It should be understood that throughout the drawings, corresponding reference numerals indicate like or corresponding parts and features.

With reference to FIG. 1 of the drawings, an exemplary vehicle constructed in accordance with the teachings of the present disclosure is generally indicated by reference numeral 10. The vehicle 10 can include an engine 14 and a drive line 16. The drive line 16 can include a transmission 18, a driveshaft assembly 20 (or propshaft assembly), a rear axle 22 and a plurality of wheels 24. The engine 14 can produce rotary power that can be transmitted to the transmission 18 in a conventional and well known manner. The transmission 18 can be conventionally configured and can include a transmission output shaft 18a, and a gear reduction unit (not specifically shown). As is well known in the art, the gear reduction unit can change the speed and torque of the rotary power provided by the engine 14 such that a rotary output of the transmission 18 (which can be transmitted through the transmission output shaft 18a) can have a relatively lower speed and higher torque than that which was input to the transmission 18. The driveshaft assembly 20 can be coupled for rotation with the transmission output member 18a, to permit drive torque to be transmitted from the transmission 18 to the rear axle 22 where the drive torque can be selectively apportioned in a predetermined manner to the left and right rear wheels 24a, and 24b,, respectively.

It will be appreciated that while the vehicle in the particular example provided employs a drive line with a rear-wheel drive arrangement, the teachings of the present disclosure have broader applicability. In this regard, a driveshaft assembly constructed in accordance with the teachings of the present disclosure may interconnect a first drive line component with a second drive line component to transmit torque therebetween. In the context of an automotive vehicle, the drive line components could be a transmission, a transfer case, a viscous coupling, an axle assembly, or a differential, for example.

Figure 2:
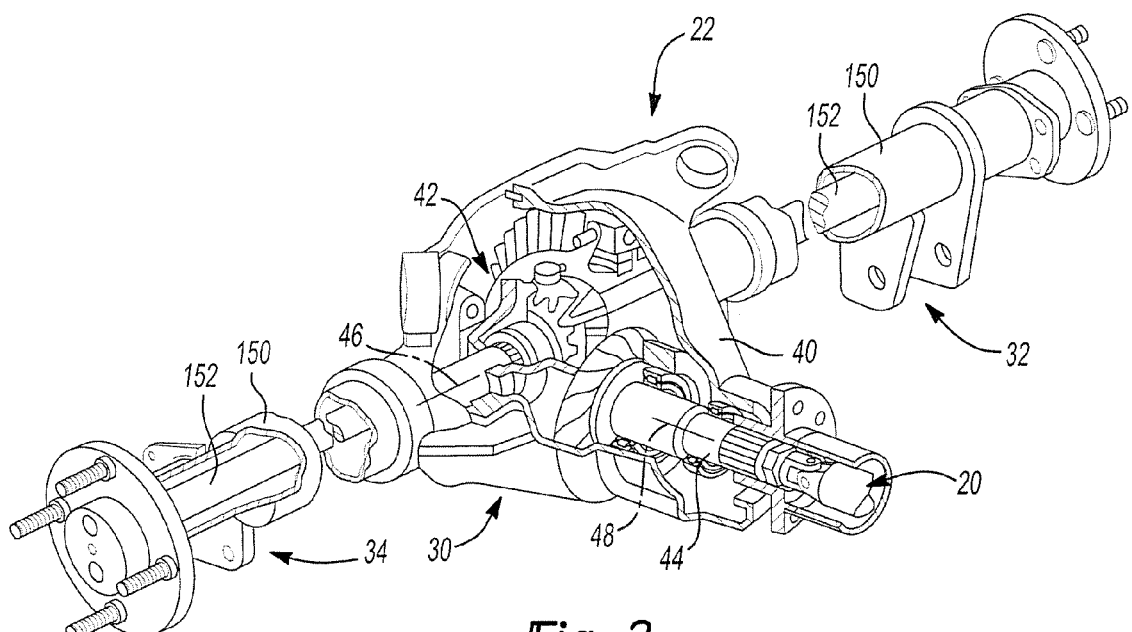
FIG. 2 is a top partially cut-away view of a portion of the vehicle of FIG. 1 illustrating the rear axle and the driveshaft assembly in greater detail.

With reference to FIG. 2, the rear axle 22 can include a differential assembly 30, a left axle shaft assembly 32 and a right axle shaft assembly 34. The differential assembly 30 can include a housing 40, a differential unit 42 and an input shaft assembly 44. The housing 40 can support the differential unit 42 for rotation about a first axis 46 and can further support the input shaft assembly 44 for rotation about a second axis 48 that is perpendicular to the first axis 46.

Figure 3:
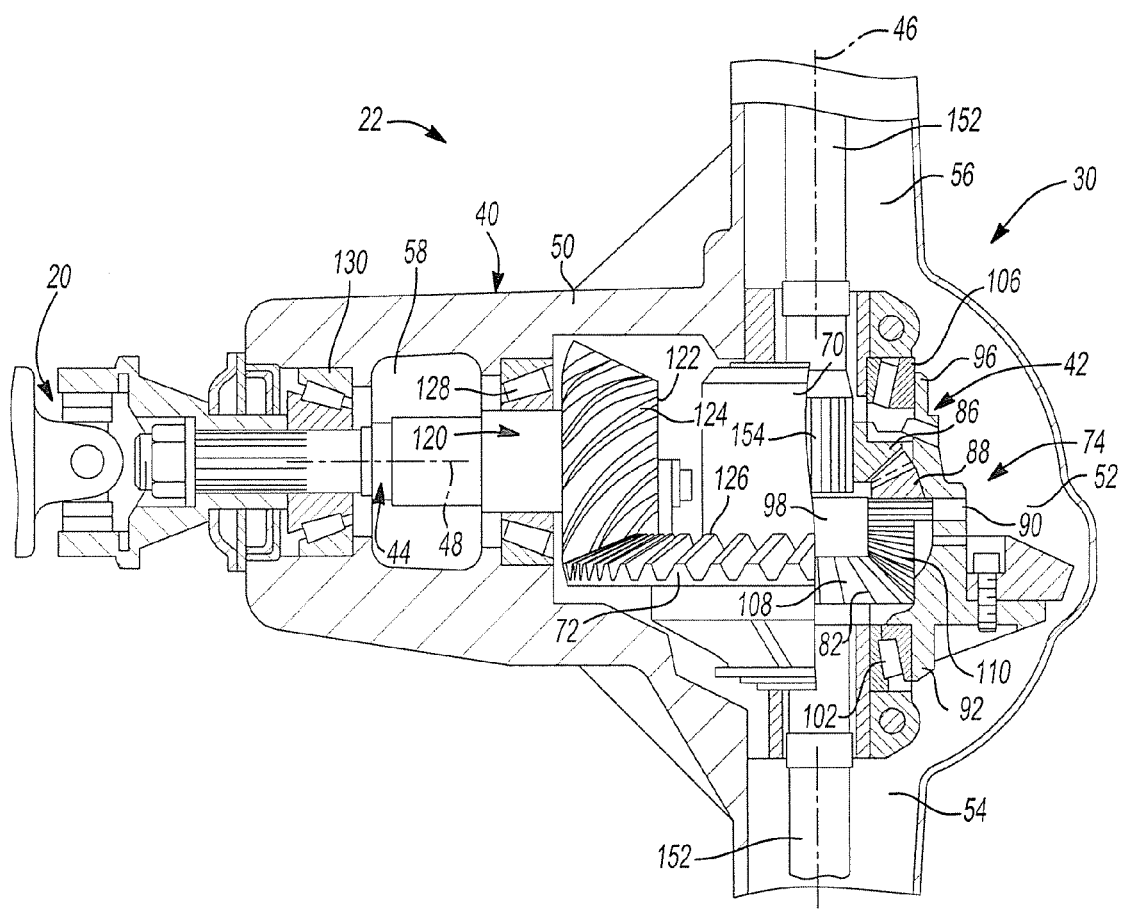
FIG. 3 is a sectional view of a portion of the rear axle and the driveshaft assembly.

With additional reference to FIG. 3, the housing 40 can be formed in a suitable casting process and thereafter machined as required. The housing 40 can include a wall member 50 that can define a central cavity 52 that can have a left axle aperture 54, a right axle aperture 56, and an input shaft aperture 58. The differential unit 42 can be disposed within the central cavity 52 of the housing 40 and can include a case 70, a ring gear 72, which can be fixed for rotation with the case 70, and a gearset 74 that can be disposed within the case 70. The gearset 74 can include first and second side gears 82 and 86 and a plurality of differential pinions 88, which can be rotatably supported on pinion shafts 90 that can be mounted to the case 70. The case 70 can include a pair of trunnions 92 and 96 and a gear cavity 98. A pair of bearing assemblies 102 and 106 can support the trunnions 92 and 96, respectively, for rotation about the first axis 46. The left and right axle assemblies 32 and 34 can extend through the left and right axle apertures 54 and 56, respectively, where they can be coupled for rotation about the first axis 46 with the first and second side gears 82 and 86, respectively. The case 70 can be operable for supporting the plurality of differential pinions 88 for rotation within the gear cavity 98 about one or more axes that can be perpendicular to the first axis 46. The first and second side gears 82 and 86 each include a plurality of teeth 108 which meshingly engage teeth 110 that are formed on the differential pinions 88.

The input shaft assembly 44 can extend through the input shaft aperture 58 where it can be supported in the housing 40 for rotation about the second axis 48. The input shaft assembly 44 can include an input shaft 120, a pinion gear 122 having a plurality of pinion teeth 124 that meshingly engage the teeth 126 that are formed on the ring gear 72, and a pair of bearing assemblies 128 and 130 that can cooperate with the housing 40 to rotatably support the input shaft 120. The input shaft assembly 44 can be coupled for rotation with the driveshaft assembly 20 and can be operable for transmitting drive torque to the differential unit 42. More specifically, drive torque received the input shaft 120 can be transmitted by the pinion teeth 124 to the teeth 126 of the ring gear 72 such that drive torque is distributed through the differential pinions 88 to the first and second side gears 82 and 86.

The left and right axle shaft assemblies 32 and 34 can include an axle tube 150 that can be fixed to the associated axle aperture 54 and 56, respectively, and an axle half-shaft 152 that can be supported for rotation in the axle tube 150 about the first axis 46. Each of the axle half-shafts 152 can include an externally splined portion 154 that can meshingly engage a mating internally splined portion (not specifically shown) that can be formed into the first and second side gears 82 and 86, respectively.

With reference to FIG. 4, the driveshaft assembly 20 can include a hollow shaft or shaft structure 200, first and second caps 202a and 202b, a pair of inserts 204, and first and second universal joints 206 and 208.

With additional reference to FIGS. 5 and 6, the shaft structure 200 can be generally cylindrical hollow shaft having a wall member that defines a cylindrical outer portion 220 (or outer surface), an inner portion 222 (or inner surface) and a hollow central cavity 224 disposed about a longitudinal axis 226 about which the shaft structure 200 is rotatable. The shaft structure 200 may be formed of suitable tubular material, such as a welded seamless steel or aluminum. One suitable aluminum material is 6061-T6, aluminum tubing conforming to ASTM B-210.

In the particular embodiment illustrated, the shaft structure 200 has a uniform lateral cross-section between the first and second ends 212, 214, but it will be appreciated that the shaft structure 200 could be otherwise formed. For example, regions adjacent the first and second ends 212, 214 of the shaft structure 200 could be necked-down (e.g., via rotary swaging) relative to a central portion of the shaft structure 200.

The outer portion 220 and/or the inner portion 222 can include a plurality of integrally formed splines 228 and grooves 229 alternatingly disposed thereon. In the particular example provided, the splines 228 and grooves 229 are formed only on the inner portion 222, while the outer portion 220 is generally cylindrically shaped. Accordingly, while the following discussion specifically refers to the inner portion 222, those of skill in the art will appreciate that the discussion of the splines 228 and grooves 229 could additionally or alternatively refer to the outer portion 220. The splines 228 may be radially spaced apart from each other around the inner portion 222 and can extend longitudinally, substantially parallel to the longitudinal axis 226 (shown best in FIG. 5). Each of the grooves 229 can be disposed between two of the splines 228. The splines 228 and grooves 229 may span the length of the shaft structure 200, i.e., extending from the first end 212 to the second end 214. The shaft structure 200 having the splined inner portion 222, as described above may be formed by the drawn-over-mandrel (DOM) process, for example, or any other suitable manufacturing process.

Each spline 228 can include a crown 230, while each groove 229 can include a root 232. The crowns 230 may be generally rounded and convex, while the roots 232 may be generally rounded and concave. The crowns 230 and the roots 232 can be alternately disposed around the inner portion 222.

The crown 230 and the roots 232 can be defined by radii, and the radius of the crown 230 can be different from the radius of the roots 232. In the particular embodiment illustrated, the crowns 230 are defined by a first radius, while the roots 232 are defined by a second, relatively smaller radius. The radially inward ends of the crowns 230 can define a minor diameter 238. The centers 234 of the first radii that define the crowns 230 can be disposed on a major diameter 236 of the splined inner portion 222. The second radii that define the roots 232 can be tangent to a pair of the first radii and to the major diameter 236 of the inner portion 222. It should be appreciated, however, that the geometry of the crowns 230 and roots 232 can vary from the geometry described above without departing from the scope of the present disclosure.

The splines 228 disposed on the inner portion 222 can be configured to increase the area moment of inertia and/or torsional yield strength of the shaft structure 200 (relative to a conventional straight-walled tube). Additionally or alternatively, the splined inner portion 222 may sufficiently increase the area moment of inertia of the shaft structure 200 to allow a reduction in the mass of the shaft structure 200.

It will be appreciated from this disclosure that the number and shape of the splines 228 and grooves 229 can be selected so that the shaft structure 200 will be capable of operation at a desired critical speed and/or of transmitting a desired amount of drive torque. In some situations, it may be helpful to consider the distribution ratio of the shaft structure 200. The distribution ratio is the surface area of the inner surface that conforms to the crowns divided by the total surface area of the inner portion 222. The distribution ratio for a given shaft structure 200 can be greater than about 45%, such as between about 55% to about 90% and in some applications could be about 80%.

Returning to FIG. 4, the liner(s) can be received into the central cavity 224 and engaged to the inner portion 222 in a suitable manner (e.g., frictionally engaged). The liner(s) 204 can be any liner suited to improve NVH properties of the driveshaft assembly 20 and can be configured to attenuate bending mode vibration, torsion mode vibration, shell mode vibration, and combinations thereof. In the particular example provided, the liners 204 are configured to attenuate bending mode vibration and are located centrally about respective nodes 250 corresponding to a second bending mode.

The first and second caps 202a, and 202b, can be fixedly coupled to first and second ends 212, 214, respectively, of the shaft structure 200 via a suitable coupling means, such as welding, bonding, or fastening. Each of the first and second caps 202a, 202b, can include a male connector portion 240 that can be received into the central cavity 224 of the shaft structure 200 and engaged to the splines 228. Alternatively, the male connector portion 240 could be received into the central cavity 224 and be sized relatively smaller that the minor diameter 238.

Each of the universal joints 206, 208 can include a spider 300, a first yoke 302, a second yoke 304, a transmission member 306 and a plurality of bearings 308 that can be received between the spider 300 and the yokes 302, 304. The spider 300, second yoke 304, transmission member 306 and bearings 308 can be conventional in their construction and as such, need not be discussed in detail herein. The transmission member 306 can be any type of member for non-rotatably coupling the driveshaft assembly 20 to two driveline components, such as the transmission 18 (FIG. 1) and the rear axle 22 (FIG. 1). In the particular example provided, the transmission member 306 associated with the first universal joint 206 includes a male splined shaft 208, whereas the transmission member 306 associated with the second universal joint 208 includes a yoke flange 322 that is configured to be fastened to the input shaft 120 (FIG. 3). The first yoke 302 can include a pair of arms 330 (only one shown) that can be fixedly coupled (e.g., integrally formed with) an associated one of the caps 202a, 202b. A bearing aperture 332 can be formed in each of the arms 330 and can be configured to receive a corresponding one of the bearings 308 and a trunnion (not specifically shown) formed on the spider 300.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out this invention, but that the scope of the present disclosure will include any embodiments falling within the foregoing description and the appended claims.

What is claimed is:

1. A driveshaft comprising:
    a hollow shaft that is rotatable about an axis, the hollow shaft having an annular wall member that defines an outer surface, an inner surface and a pair of opposite ends, at least one of the outer surface and the inner surface including a plurality of longitudinally extending splines;
    a pair of caps fixedly coupled to the opposite ends of the hollow shaft to at least substantially close the opposite ends; and
    a universal joint coupled to one of the caps;
    wherein the splines extend the length of the hollow shaft;
    wherein each of the plurality of longitudinally extending splines is disposed between a pair of longitudinally extending grooves, wherein each of the longitudinally extending splines has a convex crown that is defined by a first radius and wherein each of the longitudinally extending grooves has a concave root that is defined by a second radius.

2. The driveshaft of claim 1, wherein each root is tangent an associated one of the crowns.

3. The driveshaft of claim 2, wherein the first radius is different from the second radius.

4. The driveshaft of claim 3, wherein the first radius is larger than the second radius.

5. The driveshaft of claim 1, wherein the first radius is different from the second radius.

6. The driveshaft of claim 5, wherein the first radius is greater than the second radius.

7. The driveshaft of claim 1, wherein a distribution ratio of the hollow shaft is defined by dividing the portion of a surface area of at least one of the outer surface and the inner surface that conforms to the crowns by the surface area of the at least one of the outer surface and the inner surface and wherein the distribution ratio of the hollow shaft is greater than about 45%.

8. The driveshaft of claim 7, wherein the distribution ratio is about 55% to about 90%.

9. The driveshaft of claim 8, wherein the distribution ratio is about 80%.

10. The driveshaft of claim 1, wherein the plurality of longitudinally extending splines are uniformly spaced apart around the at least one of the outer surface and the inner surface.

11. The driveshaft of claim 1, wherein each of the caps has a male spline connector portion that is received into the hollow shaft and which matingly engages the plurality of longitudinally extending splines.

12. The driveshaft of claim 1, further comprising a discrete vibration attenuating element received into the hollow shaft and engaged to the inner surface.

13. The driveshaft of claim 12, wherein the vibration attenuating element is located at a node of a bending mode.

14. The driveshaft of claim 1, wherein a lateral cross-section of the hollow shaft is uniform over the entire length of the hollow shaft.

15. A vehicle driveline comprising:
    a first driveline component;
    a second driveline component; and
    a driveshaft coupling the first driveline component to the second driveline component to transmit drive torque therebetween, the driveshaft having a hollow shaft, a pair of caps, and a pair of universal joints, the hollow shaft having an annular wall member that defines an outer surface, an inner surface and a pair of opposite axial ends, at least one of the outer surface and the inner surface having a plurality of longitudinally extending splines and a plurality of longitudinally extending grooves that are disposed between the plurality of longitudinally extending splines, the pair of caps being fixedly coupled to the hollow shaft to at least substantially close the opposite axial ends, each of the universal joints being coupled to an associated one of the caps;

wherein the longitudinally extending splines extend along the hollow shaft between the caps, wherein each of the plurality of longitudinally extending splines is disposed between a pair of longitudinally extending grooves, wherein each of the longitudinally extending splines has a convex crown that is defined by a first radius and wherein each of the longitudinally extending grooves has a root that is defined by a second radius.

16. The vehicle driveline of claim 15, wherein a distribution ratio of the hollow shaft is defined by dividing the portion of a surface area of the at least one of the outer surface and the inner surface that conforms to the crowns by the surface area of the at least one of the outer surface and the inner surface and wherein the distribution ratio of the hollow shaft is greater than about 45%.

17. The vehicle driveline of claim 15, further comprising a discrete vibration attenuating element received into the hollow shaft and engaged to the inner surface.

18. A driveshaft comprising:
a hollow shaft that is rotatable about an axis, the hollow shaft having an annular wall member that defines an outer surface, an inner surface and a pair of opposite ends, at least one of the outer surface and the inner surface including a plurality of longitudinally extending splines;
a discrete vibration attenuating element received into the hollow shaft and engaged to the inner surface;
a pair of caps fixedly coupled to the opposite ends of the hollow shaft to at least substantially close the opposite ends; and
a universal joint coupled to one of the caps;
wherein the splines extend the length of the hollow shaft, wherein each of the plurality of longitudinally extending splines is disposed between a pair of longitudinally extending grooves, wherein each of the longitudinally extending splines has a crown that is defined by a first radius and wherein each of the longitudinally extending grooves has a root that is defined by a second radius, wherein each root is tangent an associated one of the crowns, wherein the first radius is larger than the second radius, wherein a distribution ratio of the hollow shaft is defined by dividing the portion of a surface area of the at least one of the outer surface and the inner surface that conforms to the crowns by the surface area of the at least one of the outer surface and the inner surface and wherein the distribution ratio of the hollow shaft is greater than about 45%, wherein the plurality of longitudinally extending splines are uniformly spaced apart around the at least one of the outer surface and the inner surface, wherein each of the caps has a male spline connector portion that is received into the hollow shaft and which matingly engages the plurality of longitudinally extending splines, wherein the vibration attenuating element is located at a node of a bending mode, and wherein a lateral cross-section of the hollow shaft is uniform over the entire length of the hollow shaft.

* * * * *